United States Patent Office 2,732,403
Patented Jan. 24, 1956

2,732,403

N - ARALKYL - N - HYDROCARBYLOXYALKYL-HALOGENATED-ALKANAMIDES AND THEIR PREPARATION

Alexander R. Surrey, Albany, N. Y., assignor to Sterling Drug Inc., New York, N. Y., a corporation of Delaware No Drawing. Application February 19, 1954,
Serial No. 411,554

21 Claims. (Cl. 260—562)

This invention relates to N-aralkyl-N-hydrocarbyloxyalkyl-halogenated-alkanamides and to their preparation.

The compounds of my invention have the general formula

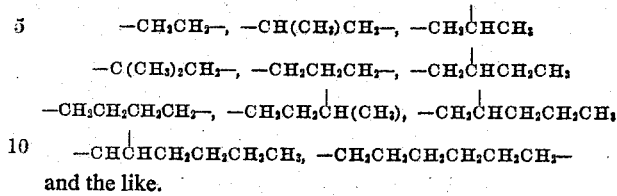

where Ar is a member selected from the group consisting of phenyl, naphthyl, biphenylyl, furyl, pyridyl and thienyl radicals, X is a lower alkylene radical having one to four carbon atoms, Y is a lower alkylene radical having two to six carbon atoms and having its two free valence bonds on different carbon atoms, R is a hydrocarbyl radical having from one to eight carbon atoms and Ac is a lower halogenated-alkanoyl radical having one to four carbon atoms. These halogenated-alkanamides have valuable chemotherapeutic properties, for instance, amebacidal activity.

The radical Ar can have from one to three substituents such as halo, lower alkoxy, lower alkyl, lower alkylmercapto, lower alkylsulfonyl, nitro and di(lower alkyl)-amino. Furthermore, said substituents can be in any of the available positions of the Ar nucleus, and where more than one substituent, they can be the same or different and can be in any of the various position combinations relative to each other. The halo substituents include chloro, bromo, iodo and fluoro. The lower alkoxy, lower alkyl, lower alkylmercapto and lower alkylsulfonyl substituents, and the lower alkyl radicals of said di(lower alkyl)amino substituent, have preferably one to six carbon atoms, including such substituents as: methoxy, ethoxy, methylenedioxy, ethylenedioxy, n-propoxy, isopropoxy, isobutoxy, n-amoxy, n-hexoxy, and the like, when lower alkoxy; methyl, ethyl, n-propyl, isopropyl, n-butyl, isobutyl, 2-butyl, n-amyl, n-hexyl, and the like, when lower alkyl; methylmercapto, ethylmercapto, n-propylmercapto, isobutylmercapto, n-hexylmercapto, and the like, when lower alkylmercapto; and methylsulfonyl, ethylsulfonyl, n-proplysulfonyl, isobutylsulfonyl, n-hexylsulfonyl, and the like, when lower alkylsufonyl; and dimethylamino, ethyl-methylamino, diisobutylamino, di-n-hexylamino, and the like, when di(lower alkyl)-amino.

Preferred embodiments of my invention are those N - aralkyl - N - hydrocarbyloxyalkyl - halogenated-alkanamides where Ar is a phenyl radical as described above.

The lower alkylene radical X has one to four carbon atoms, and includes such examples as

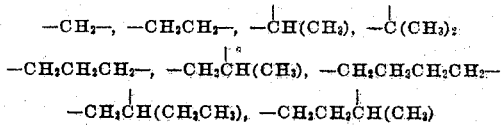

and the like.

The lower alkylene radical Y has two to six carbon atoms and has its two free valance bonds on different carbon atoms, and includes such examples as

—CH₂CH₂—, —CH(CH₃)CH₂—, —CH₂ĊHCH₃

—C(CH₃)₂CH₂—, —CH₂CH₂CH₂—, —CH₂ĊHCH₂CH₃

—CH₂CH₂CH₂CH₂—, —CH₂CH₂ĊH(CH₃), —CH₂ĊHCH₂CH₂CH₃

—CHĊHCH₂CH₂CH₃, —CH₂CH₂CH₂CH₂CH₂— and the like.

The hydrocarbyl radical R has from one to eight carbon atoms, for instance, alkyl, alkenyl, cycloalkyl, cycloalkylalkyl, phenyl, alkylated-phenyl, benzyl or phenethyl, and includes such examples as: methyl, ethyl, n-propyl, isopropyl, 2-butyl, isoamyl, n-hexyl, and the like, when alkyl; ethenyl, 2-propenyl, 3-butenyl, 2-hexenyl, and the like, when alkenyl; cyclopropyl, cyclobutyl, cyclopentyl, cyclohexyl, and the like, when cycloalkyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylated-phenyl.

The lower halogenated-alkanoyl radical Ac has one to four carbon atoms, and includes such examples as chloroformyl (chloromethanoyl), chloroacetyl (chloroethanoyl), iodoacetyl, fluoroacetyl, dichloroacetyl (dichloroethanoyl), dibromoacetyl, trichloroacetyl, 2-chloropropanoyl (alpha-chloropropionyl), 3-bromopropanoyl, 2,2-diiodopropanoyl, 2-bromo-3-chloropropanoyl, 2,2-dichloropropanoyl, 2,2-difluoropropanoyl, 2,2,3-trichloropropanoyl (alpha,alpha,beta - trichloropropionyl), 2-chlorobutanoyl (alpha-chlorobutyryl), 3-bromobutanoyl, 2,2-dichlorobutanoyl, 3,4-dibromobutanoyl, 2,2,3-trichlorobutanoyl, 2,3,4-trichlorobutanoyl, and the like.

The compounds of my invention were prepared by reacting a secondary aminoether of the formula Ar—X—NH—Y—O—R with an acylating agent selected from the group consisting of those having the formula Ac-halogen and (Ac)₂O, where Ar, X, Y, R and Ac have the meanings given above. When a halogenated-alkanoyl halide, Ac-halogen, was used, the halide halogen, i. e., the halo radical attached to the carbonyl function, was preferably chloro, however, other halo radicals, i. e., bromo, iodo and fluoro also can be used. Illustrations of the process of my invention are: the preparation of N-(2,4-dichlorobenzyl)-N-(2-ethoxyethyl)dichloroacetamide by reacting N-(2-ethoxyethyl)-2,4-dichlorobenzylamine with dichloroacetyl chloride; the preparation of N-(2,4-dibromobenzyl) - N - (2 - n - propoxypropyl) - 2,3 - dichloropropamamide by reacting N-(2-n-propoxypropyl)-2,4-dibromobenzylamine with 2,3-dichloropropanoyl chloride; and the preparation of N-(4-nitrophenethyl)-N-(4-methoxybutyl)-2,2-difluorobutanamide by reacting N-(4-methoxybutyl)-4-nitrophenethylamine with 2,2-difluorobutanoic anhydride. When a halogenated-alkanoic anhydride is used, the reaction can be carried out at room temperature or higher if necessary. When a halogenated-alkanoyl halide was used the reaction was carried out preferably below room temperature, with chilling if necessary. In the preparation of a chloroformamide, an N-hydrocarbyloxyalkyl-aralkylamine, preferably as its hydrochloride, is reacted with phosgene while suspended in refluxing toluene, e. g., preparation of N-(2,4-dichlorobenzyl) - N - (2 - ethoxyethyl)chloroformamide by bubbling phosgene into a suspension of N-(2-ethoxyethyl)-2,4-dichlorobenzylamine hydrochloride in refluxing toluene.

The intermediate N - hydrocarbyloxyalkyl - aralkyl - amines of the above formula were prepared by various methods. In one method an aralkyl halide, Ar-X-halogen, was reacted with an aminoether, R—O—Y—NH₂, e. g., N-(3-ethoxypropyl)-2,4-dichlorobenzylamine by reacting 3-ethoxypropylamine with 2,4-dichlorobenzyl chloride. In another method, for the preparation of compounds where X is CH₂, an aldehyde of the formula Ar—CHO was reacted with an aminoether, R—O—Y—NH₂, to form an anil, Ar—CH=N—Y—O—R, which was hydrogenated directly (without isolation) to form the product, Ar—CH₂—NH—Y—O—R, e. g., N-(2-n-butoxyethyl)-4-n-butoxybenzylamine by reacting 2-n-butoxyethylamine with 4-n-butoxybenzaldehyde and hydrogenating the resulting anil. A third method used in preparing these intermediate N-hydrocarbyloxyalkyl-aralkylamines was the reaction of an aralkylamine, Ar—X—NH₂, with an alkoxyalkyl halide, R—O—Y-halogen, e. g., N-(2-cyclopropoxyethyl)-3,4-dibromophenethylamine by reacting 3,4-dibromophenethylamine with 2-cyclopropoxyethyl chloride. These intermediate N-hydrocarbyloxyalkyl-aralkylamines are disclosed and claimed in my copending divisional application Serial Number 537,553, filed September 29, 1955.

The following examples will further illustrate specific embodiments of the invention without, however, limiting it thereto.

EXAMPLE 1

A. *Intermediate aminoethers*, Ar—X—NH—Y—OR

These intermediates were prepared by several methods, one of which is described and illustrated in this example; other methods are presented in Examples 2A and 2B. One method of preparing these aminoethers involves the reaction of an aralkylamine, Ar—X—NH₂, with a hydrocarbyl haloalkyl ether, R—O—Y-halide, as illustrated by the following preparation of N-(2-ethoxyethyl)-2,4-dichlorobenzylamine: 57 g. of 2,4-dichlorobenzylamine and 17.6 g. of 2-ethoxyethyl chloride were heated together with stirring for seven hours at 140–150° C. The reaction mixture was cooled and about 150 ml. of ether was added. The 2,4-dichlorobenzylamine hydrochloride that precipitated was filtered off and dried; weight, 32 g. (theory, 34 g.). The ether filtrate was evaporated in vacuo and the residue distilled under reduced pressure. There was thus obtained 21 g. of product, N-(2-ethoxyethyl)-2,4-dichlorobenzylamine, B. P. 100–104° C. at 0.05 mm. Hg; $n_D^{25}$ = 1.5208.

*Anal.*—Calcd. for $C_{11}H_{15}Cl_2NO$: N, 5.64. Found: N, 5.33.

N - (2 - ethoxyethyl) - 2,4 - dichlorobenzylamine in the form of its hydrochloride melted at 100–102° C.

Other aminoethers that were prepared following the procedure described for the preparation of N-(2-ethoxyethyl)-2,4-dichlorobenzylamine using the appropriate reactants are given in Table I.

Table I

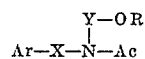

| Q | R | B. P., ° C. at mm. Hg | $n_D^{25}$ |
|---|---|---|---|
| 3,4-di-Cl | C₂H₅ | 119–125 at 0.5 [a] | 1.5230 |
| 4-OC₄H₉-n | C₂H₅ | 118–122 at 0.02 [b] | 1.5015 |
| 4-OC₄H₉-n | C₆H₅ | 170–178 at 0.02 | 1.5461 |
| 2,4-di-Cl | n-C₄H₉ | 135–140 at 0.4 | 1.5147 |
| 2,4-di-Cl | CH₃ | 100–105 at 0.4 | 1.5302 |
| 4-OC₄H₉-n | CH₃ | 134–137 at 0.6 | 1.5005 |
| H | C₂H₅ | 75 at 0.4 | 1.4985 |
| 4-CH(CH₃)₂ | CH₃ | 142–144 at 11.0 | 1.4995 |
| 3,4-O₂CH₂ | CH₃ | 125–126 at 0.7 | 1.5315 |
| 3,4-di-Cl | n-C₄H₉ | 144–148 at 0.4 [c] | 1.5150 |

[a] M. P. of hydrochloride, 183–185° C.
[b] M. P. of hydrochloride, 158–160° C.
[c] M. P. of hydrochloride, 155–157° C.

Other aminoethers that can be prepared according to the above procedure using the appropriate reactants include: N - (2 - ethoxyethyl) - 1 - naphthylmethylamine, N - (2 - ethoxyethyl) - 1 - biphenylylmethylamine, N - (2-ethoxyethyl) - 1 - furylmethylamine, N - (2 - ethoxyethyl) - 2 - pyridylmethylamine, N - (2 - ethoxyethyl) - 4 - n - hexylbenzylamine, N - (2 - n - hexoxyethyl) - 2,4 - diiodobenzylamine, N - (6 - methoxyhexyl) - 1 - (3,4 - dibromophenyl)ethylamine, N - (2 - cyclohexoxy - ethyl) - 4 - nitrophenethylamine, N - [2 - (1 - propenoxy)ethyl] - 4 - (3,4,5 - triethoxyphenyl)butylamine, N - [2 - (cyclopentylmethoxy)ethyl] - 4 - n - hexoxybenzylamine, N - [2 - (2 -phenethoxy)ethyl] - 4 - n - butlysulfonylbenzylamine, and the like.

B. *N - aralkyl - N - hydrocarbyloxyalkyl - halogenated - alkanamides*

$$\underset{\text{Ar—X—N—Ac}}{\overset{\text{Y—OR}}{|}}$$

These compounds were prepared by reacting the appropriate aminoether, Ar—X—NH—Y—OR, with an acylating agent selected from the group consisting of those having the formula Ac-halogen and (Ac)₂O. There follows an illustration of such a preparation using a halogenated-alkanoyl halide, Ac-halogen: 10 g. of dichloroacetyl chloride was added dropwise with stirring at a temperature of about 0–5° C. to 16 g. of N - (2 - ethoxyethyl) - 2,4 - dichlorobenzylamine in 150 ml. of ethylene dichloride and 70 ml. of 1 N sodium hydroxide. After the addition had been completed, the mixture was allowed to warm up to room temperature an stirred for another three hours. The ethylene dichloride layer was separated and washed successively with 1 N HCl, 10% sodium carbonate solution and water. The ethylene dichloride was removed by distilling in vacuo and the residue was distilled under reduced pressure. There was obtained a fraction distilling at 134–137° C. at 0.01 mm. On standing, this fraction solidified and was recrystallized from n-hexane to give an analytically pure sample of N - (2,4 - dichlorobenzyl) - N - (2 - ethoxyethyl)di - chloroacetamide, M. P. 72.6–74.0° C. (corr.).

*Anal.*—Calcd. for $C_{13}H_{15}Cl_4NO_2$: C, 43.49; H, 4.21; $Cl_{KOH}$, 1979. Found: C, 43.21; H, 4.16; $Cl_{KOH}$, 19.47. $Cl_{KOH}$ means hydrolyzable chlorine as determined by alkaline hydrolysis followed by gravimetric or amperometric analysis.

The same product, N-(2,4-dichlorobenzyl)-N-(2-ethoxyethyl)dichloroacetamide, can be prepared by reacting N-(2-ethoxyethyl)-2,4-dichlorobenzylamine with dichloroacetic anhydride instead of dichloroacetyl chloride. In either reaction, the N-(2-ethoxyethyl)-2,4-dichlorobenzylamine can be used in the form of an acid addition salt, e. g., hydrochloride, by using an extra quantity of sodium hydroxide to neutralize the liberated hydrogen chloride. This modification is further illustrated in Example 2B and as follows for the preparation of N - (4 - isopropylbenzyl) - N - (2 - methoxyethyl)di - chloroacetamide: 27 g. of N-(2-methoxyethyl)-4-isopropylbenzylamine hydrochloride and 22 g. of dichloroacetyl chloride were placed together with 200 ml. of benzene and refluxed for three hours with stirring. At the end of this heating period the reaction was considered complete since evolution of hydrogen chloride had ceased and the solution had become homogeneous. A small amount of methanol was added and the solvent was removed by distillation in vacuo, leaving a residue which solidified on standing. This solid was recrystallized twice from isopropanol, yielding the product, N - (4 - isopropylbenzyl) - N - (2 - methoxyethyl)dichloroacetamide, M. P. 73.7–78.5° C. (corr.).

*Anal.*—Calcd. for $C_{15}H_{21}Cl_2NO_2$: C, 56.61; H, 6.65; Cl, 22.28. Found: C, 56.44; H, 6.36; Cl, 22.0.

Other N - aralkyl - N - hydrocarbyloxyalkyl - halogenated-alkanamides that were prepared following the procedure described above for the preparation of N-(2,4- dichlorobenzyl) - N - (2 - ethoxyethyl)dichloroacetamide are given in Table II.

Table II

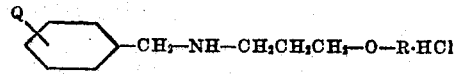

| Q | R | Ac | M. P., ° C. (corr.) |
|---|---|---|---|
| 3,4-di-Cl | C₂H₅ | CHCl₂ | 50.3-52.9. |
| 3,4-di-Cl | n-C₄H₉ | CHCl₂ | 48.0-49.6. |
| 4-OC₄H₉-n | C₂H₅ | CHCl₂ | 70.3-71.8. |
| 4-OC₄H₉-n | C₆H₅ | CHCl₂ | 79.8-84.4. |
| H | C₂H₅ | CHCl₂ | 69.7-73.0. |
| 3,4-O₂CH₂ | CH₃ | CHCl₂ | B. P., 197-200 at 0.04 mm. |
| 2,4-di-Cl | CH₃ | CCl₃ | B. P., 145-148 at 0.4 mm. |
| 2,4-di-Cl | CH₃ | CH₂Cl | B. P., 131-134 at 0.02 mm. |

Other N - aralkyl - N - hydrocarbyloxyalkyl - halogenated-alkanamides that can be prepared according to the above procedure used to prepare N-(2,4-dichlorobenzyl)-N-(2-ethoxyethyl)dichloroacetamide include the following: N - (1 - naphthylmethyl) - N - (2 - ethoxyethyl)dichloroacetamide, N - (1 - biphenylylmethyl) - N - (2 - ethoxyethyl)dichloroacetamide, N - (1 - furylmethyl) - N - (2 - ethoxyethyl)dichloroacetamide, N - (2 - pyridylmethyl) - N - (2 - ethoxyethyl)dichloroacetamide, N - (2,4 - dichlorobenzyl) - N - (2 - ethoxyethyl)dibromoacetamide, N - (3,4 - dibromobenzyl) - N - (2- ethoxyethyl)bromochloroacetamide, N - (2,4 - dichlorobenzyl) - N - (2 - ethoxyethyl)diiodoacetamide, N - (3,4- dichlorobenzyl) - N - (2 - methoxyethyl)difluoroacetamide, N - (4 - n - hexylbenzyl) - N - (2 - ethoxyethyl)- 2,2 - dichloropropanamide, N - (2,4 - diiodobenzyl)- N - (2 - n - hexoxyethyl) -2,2 - diiodopropanamide, N- [1 - (3,4 - dibromophenyl)ethyl] - N - (6 - methoxyhexyl)- 2 - bromo - 3 - chloropropanamide, N - (4 - nitrophenethyl) - N - (2 - cyclohexoxyethyl) - 2,2,3 - trichloropropanamide, N - [4 - (3,4,5 - triethoxyphenyl) butyl] - N- [2 - (1 - propenoxy)ethyl] - 2,2 - dichlorobutanamide, N - (4 - n - hexoxybenzyl) - N - [2 - (cyclopentylmethoxy)ethyl] - 3,4 - dibromobutanamide, N - (4 - n- butylsulfonylbenzyl) - N - [2 - (2 - phenethoxy)ethyl]- 2,4-dibromobutanamide, and the like.

EXAMPLE 2

A. *N-(3-alkoxypropyl)-benzylamines*

A second method (see Examples 1A and 3A for other methods) for preparing the intermediate aminoethers, Ar—X—NH—Y—OR, is illustrated as follows in the preparation of N-(3-ethoxypropyl)-3,4-dichlorobenzylamine: 19.5 g. of 3,4-dichlorobenzyl chloride was added dropwise with stirring to 30.9 g. of 3-ethoxypropylamine. The temperature rose to a maximum of about 95° C. during the addition. The reaction mixture was then stirred for an additional two hours and allowed to stand overnight. To the reaction mixture was added 35% aqueous sodium hydroxide solution and the organic layer that separated was extracted with ethylene dichloride. The extract was distilled in vacuo to remove the ethylene dichloride; the residue was dissolved in ether; and the solution was filtered. Ethanolic hydrogen chloride was added to the ether filtrate, and the solid that separated was filtered and recrystallized from ethanol. There was thus obtained 16 g. of N-(3-ethoxypropyl)-3,4-dichlorobenzylamine as its hydrochloride, M. P. 217.1-219.2° C. (corr.).

*Anal.*—Calcd. for C₁₂H₁₇Cl₂NO.HCl: Cl⁻, 11.89; C, 48.26; H, 6.07. Found: Cl⁻, 12.13; C, 48.22; H, 6.07.

Cl⁻ means ionic chlorine, i. e., chloride ion, as determined by the standard Volhard method.

Other N-(3-alkoxypropyl)-benzylamines in the form of their hydrochloride addition salts that were prepared according to the foregoing procedure are given in Table III.

Table III

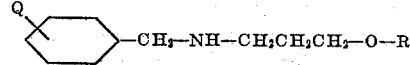

| Q | R | M. P., ° C. (corr.) |
|---|---|---|
| 2,4-di-Cl | CH₃ | 128.5-130.0. |
| 2,4-di-Cl | C₂H₅ | 127.8-133.8. |
| 2,4-di-Cl | CH(CH₃)₂ | 141.6-142.2. |
| 2,4-di-Cl | n-C₄H₉ | 115.2-117.6. |
| 3,4-di-Cl | CH₃ | 214.1-215.7. |
| 3,4-di-Cl | CH(CH₃)₂ | 208.0-209.2. |
| 3,4-di-Cl | n-C₄H₉ | 184.4-185.8. |
| 4-NO₂ | CH₃ | 188-190 (uncorr.). |

In some cases the above N-(3-alkoxypropyl)-benzylamines were isolated by distillation under reduced pressure; illustrations are listed in Table IV.

Table IV

| Q | R | B. P., °C. at mm. Hg | $n_D^{25}$ |
|---|---|---|---|
| 2,4-di-Cl | CH₃ | 132-134 at 0.5 | 1.5312 |
| 2,4-di-Cl | C₂H₅ | 132-134 at 0.5 | 1.5203 |
| 2,4-di-Cl | CH(CH₃)₂ | 140-142 at 0.3 | 1.5170 |
| 2,4-di-Cl | n-C₄H₉ | 146-148 at 0.3 | 1.5100 |
| 3,4-di-Cl | CH(CH₃)₂ | 134-137 at 0.2 | 1.5178 |
| 3,4-di-Cl | n-C₄H₉ | 162-165 at 0.7 | 1.5152 |

B. *N-(3-alkoxypropyl)-N-benzyl-dichloroacetamides*

These compounds were prepared according to the procedure described as follows for the preparation of N-(3-ethoxypropyl) - N - (3,4 - dichlorobenzyl)dichloroacetamide: 6.3 g. of dichloroacetyl chloride was added dropwise with stirring at a temperature of about 0-5° C. to 12 g. of N-(3-ethoxypropyl)-3,4-dichlorobenzylamine hydrochloride in 120 ml. of ethylene dichloride and 88 ml. of 1 N aqueous sodium hydroxide solution. After the addition had been completed, the mixture was allowed to warm up to room temperature and stirred for an additional two to three hours. The ethylene dichlororide layer was separated and washed successively with 1 N aqueous hydrochloric acid, 10% aqueous sodium carbonate solution and water. The ethylene dichloride was removed by distilling in vacuo and the residue was triturated with n-hexane until solidification resulted. The solid was recrystallized once from benzene-n-pentane, twice from n-hexane and once from isopropanol-water, followed by drying at 50° C. at 20 mm. Hg. for twenty-four hours. The product thus obtained, N-(3-ethoxypropyl) - N - (3,4 - dichlorobenzyl)dichloroacetamide, melted at 60.1-61.8° C. (corr.).

*Anal.*—Calcd. for C₁₄H₁₇Cl₄NO₂: Cl, 19.01; C, 45.07; H, 4.59. Found: Cl, 18.81; C, 45.53; H, 5.01.

Other N - (3 - alkoxypropyl) - N - benzyl - halogenated-acetamides prepared according to the foregoing procedure are given in Table V.

Table V

| Q | R | Ac | B. P., ° C. at mm. Hg |
|---|---|---|---|
| 2,4-di-Cl | CH₃ | COCHCl₂ | 159-162 at 0.01 |
| 2,4-di-Cl | C₂H₅ | COCHCl₂ | 162-164 at 0.01 |
| 2,4-di-Cl | CH(CH₃)₂ | COCHCl₂ | 170-172 at 0.02 |
| 2,4-di-Cl | n-C₄H₉ | COCHCl₂ | 174-176 at 0.05 |
| 3,4-di-Cl | CH₃ | COCHCl₂ | M. P., 98.0-103.0 (corr.) |
| 3,4-di-Cl | CH(CH₃)₂ | COCHCl₂ | 178-180 at 0.03 |
| 3,4-di-Cl | n-C₄H₉ | COCHCl₂ | 185-188 at 0.05 |
| 4-NO₂ | CH₃ | COCHCl₂ | M. P., 93.2-95.7 (corr.) |
| 2,4-di-Cl | CH₃ | COCCl₃ | M. P., 47.8-49.4 (corr.) |

EXAMPLE 3

A. N-(3-alkoxypropyl)-benzylamines

A third method (see Examples 1A and 2A for other methods) of preparing the intermediate aminoethers, Ar—X—NH—Y—OR, is illustrated as follows in the preparation of N-(3-n-butoxypropyl)-4-n-butoxybenzylamine: 17.9 g. of 4-n-butoxybenzaldehyde was added to 13.2 g. of 3-n-butoxypropylamine and a solution was obtained with evolution of heat. The resulting anil was not isolated but was hydrogenated in absolute ethanol at room temperature with palladium chloride as the catalyst. The catalyst was filtered off and the solvent removed by distillation in vacuo. The residue was dissolved in ethyl acetate and the solution treated with ethanolic hydrogen chloride solution. The solid that precipitated was filtered and recrystallized from ethanol-ether. The product thus obtained was N-(3-n-butoxypropyl)-4-n-butoxybenzylamine in the form of its hydrochloric salt, M. P. 175–176° C.

Anal.—Calcd. for $C_{18}H_{31}NO_2 \cdot HCl$: Cl⁻, 10.75; C, 65.53; H, 10.03. Found: Cl⁻, 10.78; C, 65.11; H, 10.10.

Also prepared by this procedure was N-(3-methoxypropyl)-4-n-butoxybenzylamine hydrochloride, M. P. 164–165° C.

Anal.—Calcd. for $C_{15}H_{25}NO_2 \cdot HCl$: Cl, 12.32; C, 62.58; H, 9.11. Found: Cl, 12.32; C, 62.17; H, 8.98.

B. N-(3-alkoxypropyl)-N-(4-n-butoxybenzyl)dichloroacetamides

These compounds were prepared according to the procedure described above for Example 1B using the intermediate aminoethers described under Example 3A. Thus obtained were N-(3-n-butoxypropyl)-N-(4-n-butoxybenzyl)dichloroacetamide, B. P. 188–189° C. at 0.01 mm. [Anal.—Calcd. for $C_{20}H_{31}Cl_2NO_3$: Cl, 17.54; C, 59.40; H, 7.73. Found: Cl, 17.45; C, 59.12; H, 7.51] and N-(3-methoxypropyl) - N - (4 - n - butoxybenzyl)dichloroacetamide, B. P. 188–189° C. at 0.04 mm. [Anal.—Calcd. for $C_{17}H_{25}Cl_2NO_3$: Cl, 19.56; C, 56.35; H, 6.96. Found: Cl, 19.18; C, 56.31; H, 7.23].

EXAMPLE 4

A. N-(2-phenoxyethyl)-3,4-dichlorobenzylamine

A mixture of 31.3 g. of 2-phenoxyethyl chloride and 70.5 g. of 3,4-dichlorobenzylamine was heated with stirring for seven hours at 140–150° C. The reaction mixture was allowed to cool and a quantity of ether was added to facilitate a separation of the 3,4-dichlorobenzylamine hydrochloride, 38 g. of which was then filtered off (theoretical amount is 42 g.). The ether was removed from the filtrate by distillation and the resultant heavy oil was distilled under reduced pressure, yielding the product, N-(2-phenoxyethyl)-3,4-dichlorobenzylamine, B. P. 150–156° C. at 0.02 mm., $n_D^{25}$ 1.5755.

Anal.—Calcd. for $C_{15}H_{15}Cl_2NO$: N, 4.73. Found: N, 4.61.

N-(2-phenoxyethyl)-3,4-dichlorobenzylamine in the form of its hydrochloride salt melted at 201–202° C.

Other N-(2-phenoxyethyl)-benzylamines that can be prepared according to the above procedure using the appropriate reactants include: N-(2-phenoxyethyl)-4-n-butylmercaptobenzylamine, N-[2-(4-methylphenoxy)ethyl]-4-di-n-butylaminobenzylamine and N-[2-(4-n-hexylphenoxy)ethyl]-3,4-dichlorobenzylamine.

B. N-(3,4-dichlorobenzyl)-N-(2-phenoxyethyl)dichloroacetamide

To a solution containing 26 g. of N-(2-phenoxyethyl)-3,4-dichlorobenzylamine, 150 ml. of ethylene dichloride and 97 ml. of 1 N sodium hydroxide solution was added dropwise with stirring at about 0 to 5° C. 13.9 g. of dichloroacetyl chloride. The reaction mixture was allowed to warm up to room temperature and was stirred for an additional three hours. The ethylene dichloride layer was separated; was washed successively with 1 N hydrochloric acid, 10% sodium carbonate solution and water; and was dried over anhydrous calcium sulfate. The ethylene dichloride solution was then concentrated in vacuo, yielding a semi-solid residue which completely solidified when triturated with a small quantity of isopropanol. This solid material was recrystallized twice from isopropanol yielding the product, N-(3,4-dichlorobenzyl)-N-(2-phenoxyethyl)dichloroacetamide, M. P. 129.7–132.2° C. (corr.).

Anal.—Calcd. for $C_{17}H_{15}Cl_4NO_2$: C, 50.16; H, 3.71; Cl$_{KOH}$, 17.42. Found: C, 50.53; H, 3.89; Cl$_{KOH}$, 17.19.

Other N-benzyl-N-(2-phenoxyethyl)-halogenated-alkanamides that can be prepared according to the above procedure using the appropriate reactants include the following: N-(4-n-butylmercaptobenzyl)-N-(2-phenoxyethyl)-2,3,4-trichlorobutanamide, N-(4-di-n-butylaminobenzyl)-N-[2-(4-methylphenoxy)ethyl]-2,2,3-trichlorobutanamide and N-(3,4-dichlorobenzyl)-N-[2-(4-n-hexylphenoxy)ethyl]dichloroacetamide.

The N-aralkyl-N-hydrocarbyloxyalkyl-halogenated-alkanamides of the foregoing examples when administered orally to hamsters infected with Endamoeba criceti were found to completely clear the animals at drug levels below 200 mg. per kg. of body weight. Some of the compounds, for instance, N-(3,4-dichlorobenzyl)-N-(2-ethoxyethyl)dichloroacetamide, N-(2,4-dichlorobenzyl)-N-(2-ethoxyethyl)dichloroacetamide, N-(4-n-butoxybenzyl)-N-(2-ethoxyethyl-dichloroacetamide and N-(3,4-dichlorobenzyl) - N - (3 - ethoxypropyl)dichloroacetamide, have ED$_{50}$ values below 25 mg. per kg. of body weight, ED$_{50}$ meaning the effective dose necessary to clear 50% of the hamsters of the amebic infection.

I claim:

1. A compound having the formula

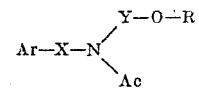

where Ar is a member selected from the group consisting of phenyl, naphthyl, biphenylyl, furyl, pyridyl and theinyl radicals and such radicals substituted by from one to three substituents selected from the group consisting of halo, lower alkoxy, lower alkyl, lower alkylmercapto, lower alkylsulfonyl, nitro and di(lower alkyl)amino, X is a lower alkylene radical having one to four carbon atoms, Y is a lower alkylene radical having two to six carbon atoms and having its two free valence bonds on different carbon atoms, R is a hydrocarbyl radical having from one to eight carbon atoms and Ac is a lower halogenated-alkanoyl radical having one to four carbon atoms.

2. A compound having the formula

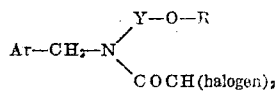

where Ar is a phenyl radical substituted by from one to three halo radicals, Y is a lower alkylene radical having two to six carbon atoms and having its two free valence bonds on different carbon atoms and R is a lower alkyl radical having one to eight carbon atoms.

3. A compound having the formula

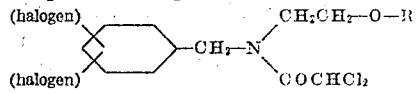

where R is a lower alkyl radical having one to eight carbon atoms.

4. A compound having the formula

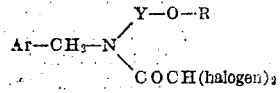

where Ar is a phenyl radical substituted by from one to three lower alkoxy radicals, Y is a lower alkylene radical having two to six carbon atoms and having its two free valence bonds on different carbon atoms and R is a lower alkyl radical having one to eight carbon atoms.

5. A compound having the formula

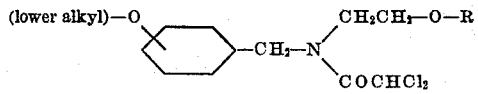

where R is a lower alkyl radical having one to eight carbon atoms.

6. N - (3,4-dichlorobenzyl) - N - (2 - ethoxyethyl)dichloroacetamide.

7. N - (2,4 - dichlorobenzyl) - N - (2 - ethoxyethyl)dichloroacetamide.

8. N - (3,4 - dichlorobenzyl) - N - (2 - n - butoxyethyl)-dichloroacetamide.

9. N - (4 - n - butoxybenzyl) - N - (2 - ethoxyethyl)-dichloroacetamide.

10. A process for the preparation of a compound having the formula

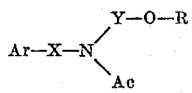

where Ar is a member selected from the group consisting of phenyl, naphthyl, biphenylyl, furyl, pyridyl and thienyl radicals and such radicals substituted by from one to three substituents from the group consisting of halo, lower alkoxy, lower alkyl, lower alkylmercapto, lower alkylsulfonyl, nitro and di(lower alkyl)amino, X is a lower alkylene radical having one to four carbon atoms, Y is a lower alkylene radical having two to six carbon atoms and having its two free valence bonds on different carbon atoms, R is a hydrocarbyl radical having from one to eight carbon atoms and Ac is a lower halogenated-alkanoyl radical having one to four carbon atoms, which comprises reacting a secondary amine of the formula, Ar–X–NH–Y–O–R with an acylating agent selected from the group consisting of those having the formula Ac-halogen and (Ac)₂O.

11. A process for the preparation of a compound having the formula

where Ar is a phenyl radical substituted by from one to three halo radicals, Y is a lower alkylene radical having two to six carbon atoms and having its two free valence bonds on different carbon atoms and R is a lower alkyl radical having one to eight carbon atoms, which comprises reacting a secondary amine of the formula, Ar–CH₂–NH–Y–O–R, with a dihaloacetyl halide.

12. A process for the preparation of a compound having the formula

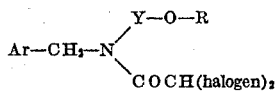

where R is a lower alkyl radical having one to eight carbon atoms, which comprises reacting an N-(2-alkoxyethyl)-dihalobenzylamine with dichloroacetyl chloride.

13. A process for the preparation of a compound having the formula

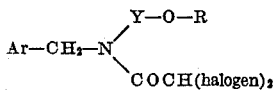

where Ar is a phenyl radical substituted by from one to three lower alkoxy radicals, Y is a lower alkylene radical having two to six carbon atoms and having its two free valence bonds on different carbon atoms and R is a lower alkyl radical having one to eight carbon atoms, which comprises reacting a secondary amine of the formula, Ar–CH₂–NH–Y–O–R, with a dihaloacetyl halide.

14. A process for the preparation of a compound having the formula

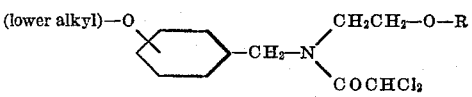

where R is a lower alkyl radical having one to eight carbon atoms, which comprises reacting an N-(2-alkoxyethyl)-alkoxybenzylamine with dichloroacetyl chloride.

15. A process for the preparation of N-(3,4-dichlorobenzyl)-N-(2-ethoxyethyl)dichloroacetamide which comprises reacting N-(2-ethoxyethyl) - 3,4 - dichlorobenzylamine with dichloroacetyl chloride.

16. A process for the preparation of N-(2,4-dichlorobenzyl)-N-(2-ethoxyethyl)dichloroacetamide which comprises reacting N-(2-ethoxyethyl)-2,4-dichlorobenzylamine with dichloroacetyl chloride.

17. A process for the preparation of N-(3,4-dichlorobenzyl)-N-(2-n-butoxyethyl)dichloroacetamide which comprises reacting N-(2-n-butoxyethyl)-3,4-dichlorobenzylamine with dichloroacetyl chloride.

18. A process for the preparation of N-(4-n-butoxybenzyl)-N-(2-ethoxyethyl)dichloroacetamide which comprises reacting N-(2-ethoxyethyl)-4-n-butoxybenzylamine with dichloroacetyl chloride.

19. A compound having the formula

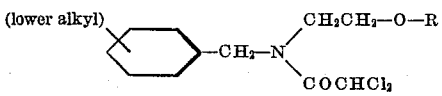

where R is a lower alkyl radical having one to eight carbon atoms.

20. N -(4 - isopropylbenzyl) - N - (2 - methoxyethyl)-dichloroacetamide.

21. A process of the preparation of N-(4-isopropylbenzyl) - N - (2 - methoxyethyl)dichloroacetamide which comprises reacting N-(2-methoxyethyl)-4-isopropylbenzylamine with dichloroacetyl chloride.

References Cited in the file of this patent

UNITED STATES PATENTS 2,569,288    Cassell et al.    Sept. 5, 1951

OTHER REFERENCES

Rebstock et al.: "J. Am. Chem. Soc.," vol. 73 (1951), p. 3670.

Mannich et al.: "Archiv. der Pharmazie," vol. 250 (1912), p. 546.